Aug. 9, 1960   A. W. SCHUELER ET AL   2,948,804
MAGNETIC FORCE RESISTANCE WELDERS AND METHOD OF CONTROLLING
THE PHASE RELATION OF THE MAGNETIC FORCE APPLIED TO THE
ELECTRODES WITH REFERENCE TO THE PHASE RELATION
OF THE WELDING CURRENT

Filed June 3, 1957                    4 Sheets-Sheet 1

INVENTORS
Arthur W. Schueler
Ernest J. Funk
BY Lawrence W. Mecklenborg
Gerald B. Tjoflat
Their attorney.

Aug. 9, 1960  A. W. SCHUELER ET AL  2,948,804
MAGNETIC FORCE RESISTANCE WELDERS AND METHOD OF CONTROLLING
THE PHASE RELATION OF THE MAGNETIC FORCE APPLIED TO THE
ELECTRODES WITH REFERENCE TO THE PHASE RELATION
OF THE WELDING CURRENT

Filed June 3, 1957  4 Sheets-Sheet 3

INVENTOR.
Arthur W. Schueler
Ernest J. Funk
Lawrence W. Mecklenborg
BY Gerald B. Tjoflat
Their attorney United States Patent Office 2,948,804
Patented Aug. 9, 1960

2,948,804

MAGNETIC FORCE RESISTANCE WELDERS AND METHOD OF CONTROLLING THE PHASE RELATION OF THE MAGNETIC FORCE APPLIED TO THE ELECTRODES WITH REFERENCE TO THE PHASE RELATION OF THE WELDING CURRENT

Arthur W. Schueler, Ernest J. Funk, and Lawrence W. Mecklenborg, all of Cincinnati, Ohio, assignors to Precision Welder & Flexopress Corporation, Cincinnati, Ohio, a corporation of Ohio Filed June 3, 1957, Ser. No. 663,141

4 Claims. (Cl. 219—86)

The invention relates to a method of and apparatus for controlling the phase relation of the magnetic force applied to welder electrodes, to the welding current at the electrodes.

The invention is particularly applicable to resistance welders having magnetic means for producing a force on the work between the electrodes. The invention relates more particularly to an arrangement for energizing the magnetic force producing means independently of the supply of welding current to the electrodes.

In resistance welders of the type under consideration the electrodes are relatively actuated to or from engagement with the work either by manually operated means or by mechanical means, such as a pneumatic power cylinder. Voltage is applied to the electrodes when they are in engagement with the work and the flow of current is so timed by a phase shift control that the product of current and time is that required for a statisfactory weld.

Welders have heretofore been provided with magnetic means energized by the weld current for applying the final weld pressure. In such welders there has been no way of so controlling the phase relation between the force so produced and the duration of the weld current that the initiation of the force could be caused to lead or lag or be in phase with the weld current.

The resistance welding of one metal piece to another involves the proper consideration of current density, time of flow of current and the pressure applied to the work between the electrodes and the relative thickness or thinness of the work pieces. These factors are further complicated if the dress face of one of the work pieces is not itself to be marred or burned, or the dress face consists of a material other than metal, for example, a sheet of plastic that has been adhesively bonded to the work piece. In the latter case it is important not to overheat the plastic at the location of the weld, for otherwise its decorative effect would be impaired if not destroyed.

The resistance welding of work pieces, usually involves what is called projection welding. The time of current application, the magnitude and time of application of the pressure of the electrodes on the work piece with reference to the flow of weld current, require careful correlation, otherwise unsatisfactory welds result.

In cases where reinforcing metal structures are to be projection welded, for example, to a sheet having a plastic covering on its dress face, the time of application of the weld pressure with reference to the time, duration and magnitude of the weld current must be particularly and carefully correlated, otherwise the plastic is damaged and its decorative effect is impaired, if not destroyed.

The resistance welding by the projection technique of various work pieces to other work pieces also requires controlled relationships between the duration and magnitude of the weld current on one hand and the time of application of the force that squeezes the work pieces together at the weld, on the other.

An object of this invention is to provide a resistance welder having means whereby the magnitude and duration of the weld pressure may be independently adjusted with reference to the duration of the weld current.

Another object of the invention is to provide a resistance welder with magnetic welding force or pressure producing means which may be energized independently of the weld current but in controlled phase relation to the weld current.

And a further object is to provide a resistance welder as above set forth in which the welder electrodes and the magnetic force producing means are provided with separate uni-directional current conducting devices, each provided with controls whereby the phase relation of the magnetic force current and the phase relation of the weld current can be independently controlled with reference to the alternating supply voltage; and whereby the phase relation of the maximum value of the magnetic force may be adjusted relative to the time of current flow to the electrodes.

The foregoing and other objects of the invention will be apparent to those of ordinary skill in the art to which the invention pertains from the following description taken in conjunction with the accompanying drawings.

Figures 6, 7:
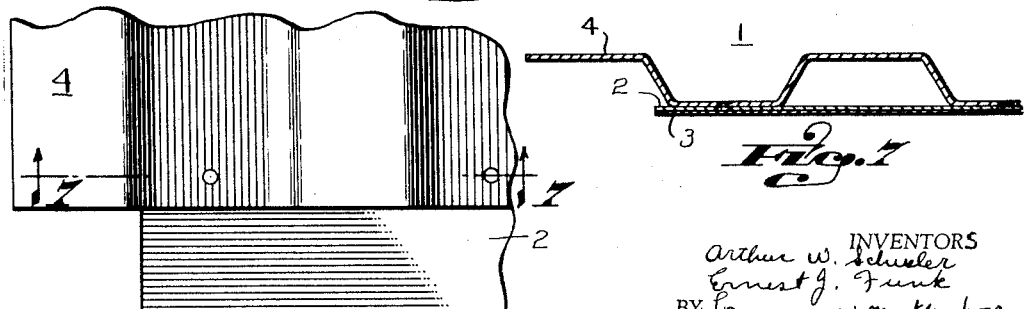
Fig. 6 is a fragmentary top plan view of a work piece that has been welded.
Fig. 7 is a view in section taken on line 7—7 of Fig. 6.

While the various embodiments of the invention described infra may be used for effecting welds between a variety of work pieces, the improvement constituting the invention is illustrated by the weld accomplishment of Figs. 6 and 7. In those views, a section of a panel 1 for station wagons and other purposes is shown. The panel comprises a sheet 2 of light gauge steel having adhesively bonded to one face thereof a layer or sheet 3 of plastic, such as vinyl resin. A reinforcing deck-like member 4 of spaced channel configuration is secured by projection resistance welds to the face opposite that covered by the plastic. The number and the location of the projection welds is a matter of design and the arrangement or pattern of the welds should be conformed to the necessities of the particular job at hand.

It is extremely difficult to weld one member to another which has a layer of material thereon, such as plastic, without impairing the appearance of the plastic from heat damage or from the squeezing of the projections through the backing sheet into the plastic, thereby putting bumps in the surface of the plastic.

By means of the invention, the weld illustrated by Figures 6 and 7 may be accomplished without marring the plastic and without resorting to such high electrode pressures that the projections are deformed through the backing sheet into the plastic prior to fusion of the projections. The welding of a work piece, such as shown in Figs. 6 and 7, may be accomplished as follows:

The reinforcing member 4 is provided with projections at predetermined locations and arranged according to a pattern suitable for the job at hand. Member 4 is placed on the sheet 2 so that the projections engage the exposed surface thereof, the plastic sheet being on the opposite surface. The work pieces are then so placed in a welder that a projection is in alignment with the electrodes. The initial pressure exerted by the electrodes on the work piece should be no greater than is necessary to establish flow of current through it, as otherwise the projection while cold might be deformed, thus impairing its intended function of localizing the heating effects of the current and minimizing the likelihood of accomplishing a weld.

In the prior art magnetic force welders, the magnetic force coils carried the same current that passed through the electrodes and the work. Inherently, therefore, the magnetic force always lagged behind the weld current. The peak force in such an arrangement could not be advanced but it could be retarded by adjustment of the magnetic circuit. Inertia of the moving parts also had some effect on the occurrence in time of the peak force. Therefore, in many types of welding, the foregoing characteristics militated against the accomplishment of satisfactory weldments.

According to our invention, the occurrence of the peak magnetic force with reference to the phase of the weld current can be advanced or retarded by controlled amounts thereby increasing the range or scope of the various weldments that can be accomplished satisfactorily.

A weld of the kind shown in Figs. 6 and 7 was accomplished by initiating the magnetic force at about 80° to 85°. The initiation of welding voltage was delayed to a point about 135° behind the initial increase of voltage in the positive direction of the power supply source. In this manner the occurrence of magnetic squeezing force at the work was so timed as to provide the proper relation to the occurrence of the weld heat. In this case the weldments were subjected to a squeezing force of rising magnitude with respect to time as they were being subject to the welding voltage. The peak value of force actually occurred at an instant after the welding voltage had ceased to be applied or had decreased to zero.

An important consideration of this invention should be obvious from the above discussion, which is, that the actual slope of the electrode force or magnetic squeezing pressure applied during the weld heating time, can be controlled. For example, by proper adjustment of the timing mechanism, a weld can be made under conditions of increasing or decreasing pressure.

By controlling the phase relationship between the initiations of the magnetic force and the weld current, and the continuation of the force after the weld current passed to zero, it produced a weld which did not mar or melt the vinyl plastic on the backing sheet 2.

Figure 1:
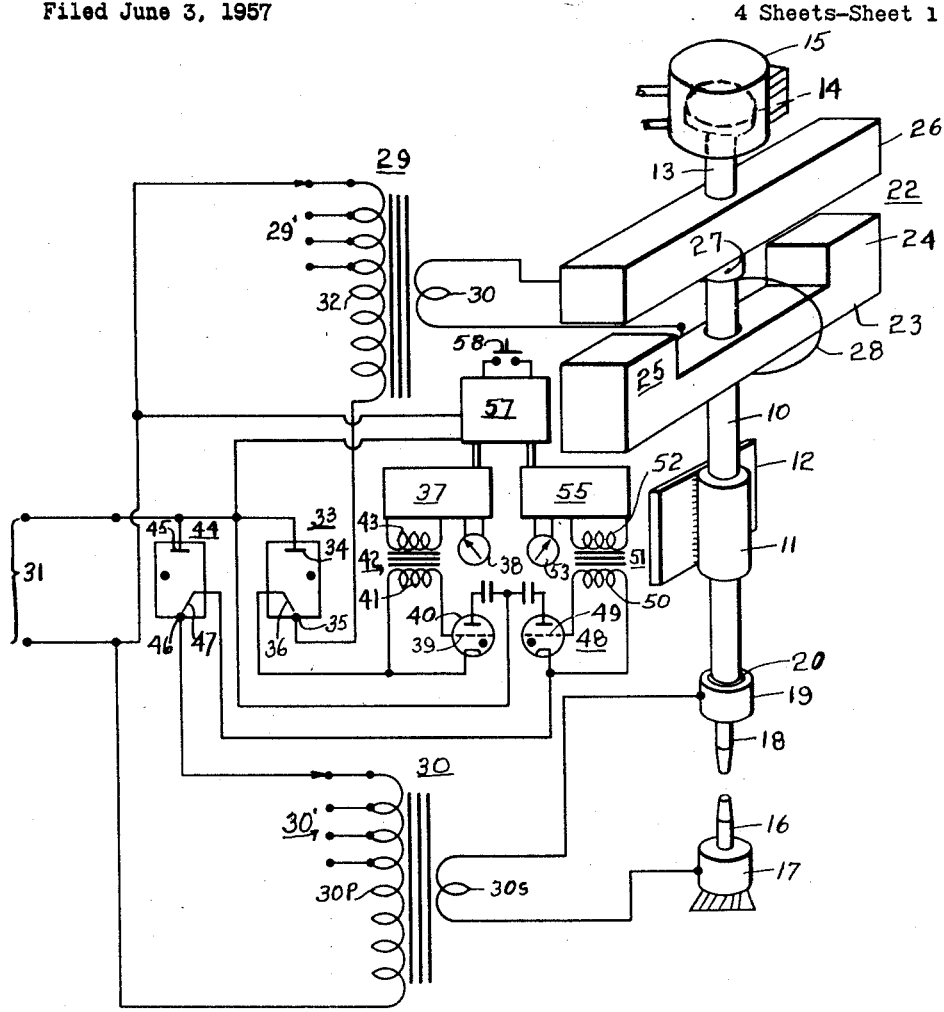
Figures 1, 2 and 3 are more or less schematic illustrations of a resistance welder arranged and constructed in accordance with embodiments of the invention.
Figure 2:
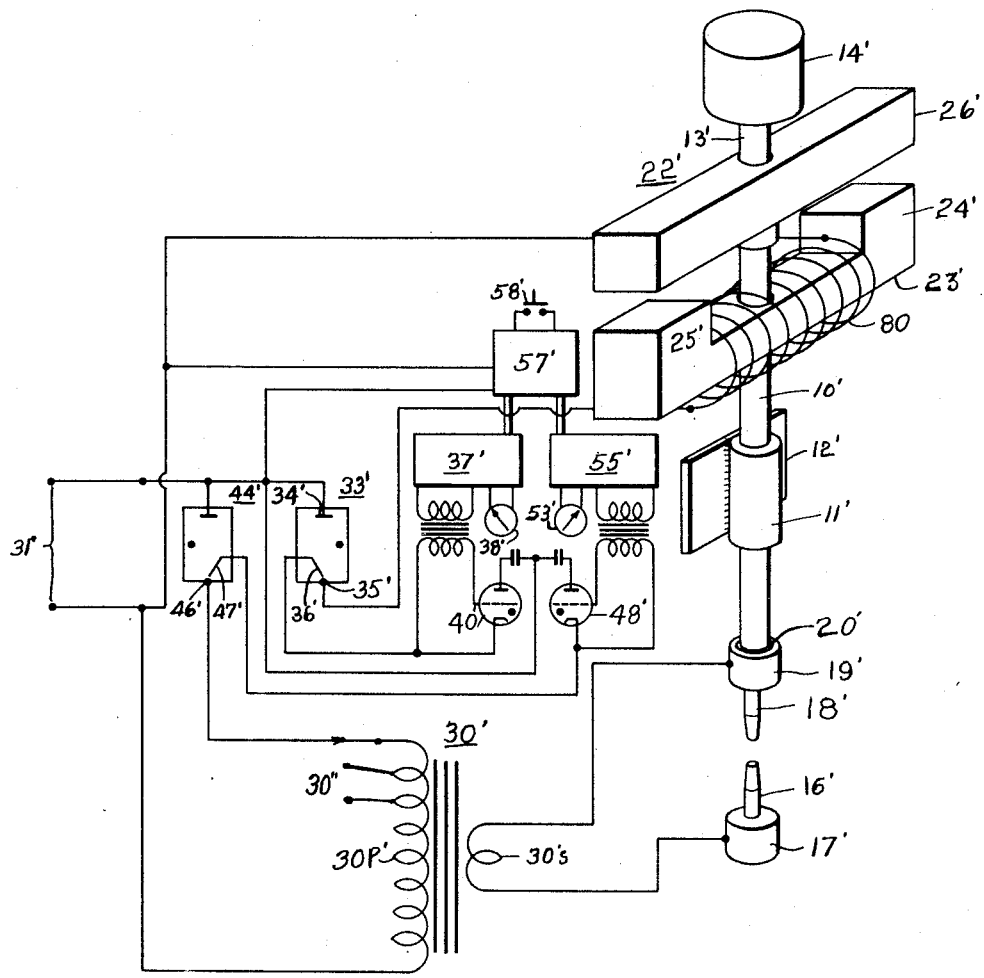
Figure 3:
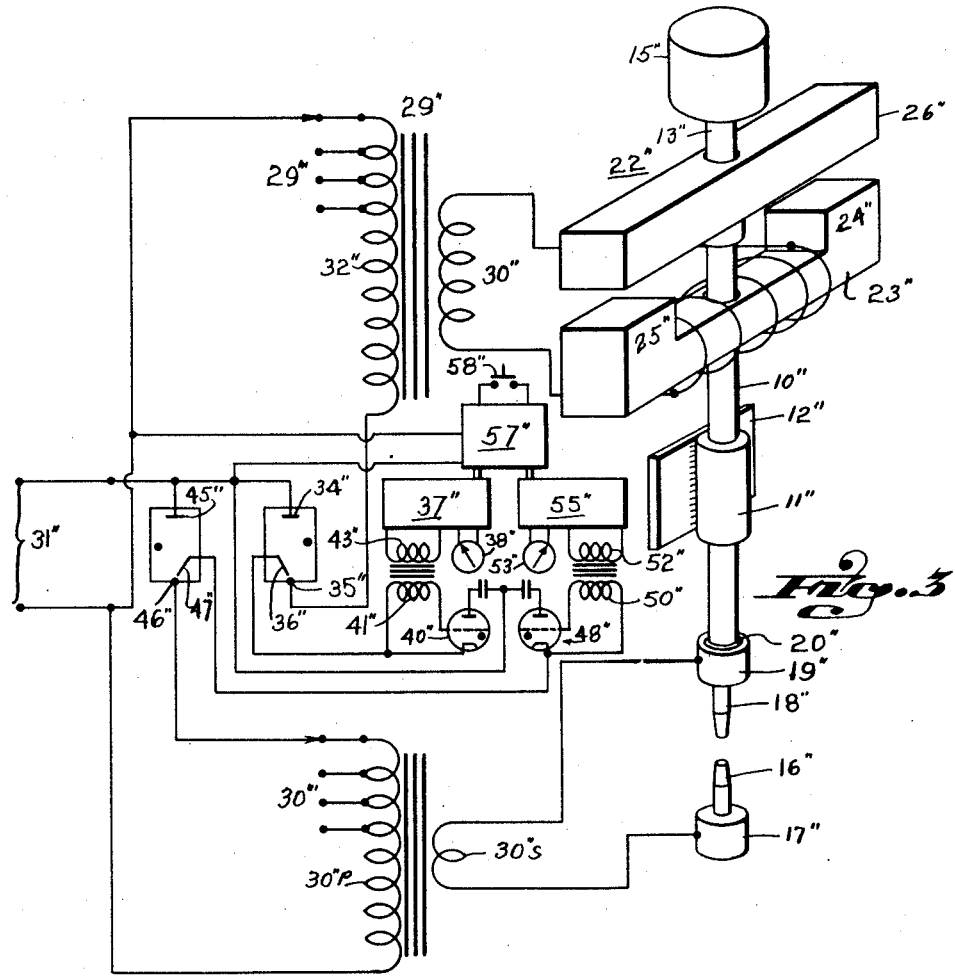

Figure 1 illustrates the apparatus employed in performing the weld of Figures 6 and 7. However, the apparatus illustrated in Figs. 2 and 3 are suitable also.

As shown in Fig. 1, the resistance welder comprises a quill 10 which is guided in a bearing 11 that is rigidly and stationarily mounted to the machine frame designated schematically at 12. The upper end of the quill 10 is connected to a piston rod 13 having a piston 14 working in a cylinder 15. The cylinder is shown as being rigidly supported by and mounted on the machine frame 12. The welder includes a stationary electrode 16 mounted in an electrode holder 17 supported by the machine frame and a movable electrode 18 carried by an electrode holder 19 secured to the quill 10 but insulated therefrom by insulation 20.

The welder includes magnetic means 22 for developing a compression or squeezing force on the work between the work pieces and the electrodes 16 and 18. The means 22 comprises a stationarily mounted armature 23 having at the ends thereof upwardly extending pole pieces 24 and 25. It also includes a movable armature 26 mounted on a collar 27 that is adjustable along the longitudinal axis of the quill in order that the air gap between the member 26 and the pole pieces 24 and 25 may be adjusted when the electrodes 18 and 16 first engage the work.

The magnetic force developing means 22 is energized by a single turn 28, the voltage and current of which is supplied by a magnetic force transformer 29.

Welding current for the electrodes 16 and 18 is supplied by a welding transformer 30 having a tap changer 30' for its primary winding 30P, and a secondary 30S connected to the electrodes.

The transformers 29 and 30 are energized with rectified alternating current derived from an alternating current supply source 31.

As shown, the primary winding 32 of transformer 29 is provided with a tap changer 29' and is supplied with current by a mercury arc rectifier 33 having an anode 34, a cathode 35 and a starter 36. The device 33 is supplied with a quantity of mercury and that mercury is vaporized by the starter 36. As soon as the vapor is present, the tube or device conducts current during a half cycle or a controlled portion thereof, of the supply voltage.

The firing, so to speak, of the device 33 is controlled by an initiation control 37 having a phase shifter control 38. The phase shifter control 38 controls the grid 39 of a tube 40, such as a Thyratron. The voltage on the grid 39 is applied by a winding 41 of a transformer 42, the primary winding 43 of which is energized by the control 37.

The operating voltage for winding 30P of the welding transformer 30 is uni-directional current of controlled duration which is supplied by a rectifier 44 of the mercury arc type. That device includes an anode 45, a cathode 46 and a starter 47. The device 44 includes a quantity of mercury which is vaporized by the starter. The starting current for the starter is supplied by a grid controlled device 48, such as a Thyratron. The grid 49 of the tube 48 is controlled by winding 50 of a transformer 51, the primary winding 52 of which is controlled as to time of energization by a phase shifter 53. The time phase energization of the transformer 51 is controlled by a weld circuit initiation control mechanism 55.

The welding force initiation control 37 and the weld current initiation control 55 are energized from a synchronous initiation control mechanism 57. That mechanism is energized by a switch 58 which is opened and closed as required.

The initiation control or control devices 37 and 55 are, as shown, connected in parallel to the voltage source 31 when switch 58 of the synchronous ignition control mechanism 57 is closed.

With a circuit arrangement as shown in Fig. 1, the time at which current commences to flow from electrode 18 to electrode 16 through the work and the duration of that flow is controlled by the phase shifter 53. Similarly, the time at which the magnetic force transformer 29 is energized and the duration of the current flow in the magnetic force coil 28 is controlled by the phase shifter 38. The phasing of the force producing circuit and the weld circuit may be accomplished independently but with reference to each other so that the proper correlation of the application and duration of the weld current and the time of application of magnetic force to the work being welded can be so adjusted as to obtain the optimum results at the weld.

Figure 4:
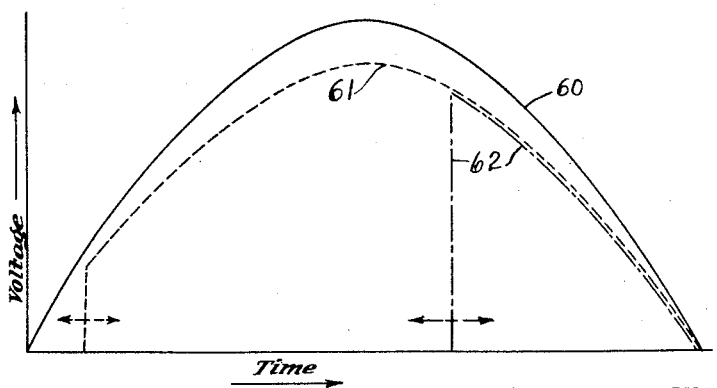
Fig. 4 is a graph showing the relationship of supply voltage, magnetic force and the welder electrode voltages.

Figure 4 illustrates the relationship of the supply voltage 31, the voltage supply for the transformer 29 and the voltage as applied to the weld transformer 30. The solid line curve 60 represents the positive half cycle of the supply voltage 31. The dotted curve 61 represents the voltage applied to the primary winding 32 of transformer 29 and the dot-dash curve 62 represents the voltage as applied to the primary winding 30P of transformer 30.

As the curves in Figure 4 illustrate, the voltage applied to the magnetic force transformer 29 may be initiated as close to the zero or origin of the voltage wave as possible, and that it persists for 180 degrees. The point of application of the voltage to the transformer 29 may be adjusted so that the voltage is applied earlier in the supply voltage curve 60 or later.

The point at which the voltage is applied to the welding circuit transformer 30 occurs at about 120 degrees being much later with reference to the time at which the voltage on the transformer 29 was applied. The time of application of the voltage to the welding circuit transformer 30 may be advanced or retarded by means of the phase shifter 53. The time of application of voltage to the magnet transformer 29 and the force developed by the magnet coil in the armatures 23 and 26 may be adjusted by the phase shifter 38.

Figure 5:
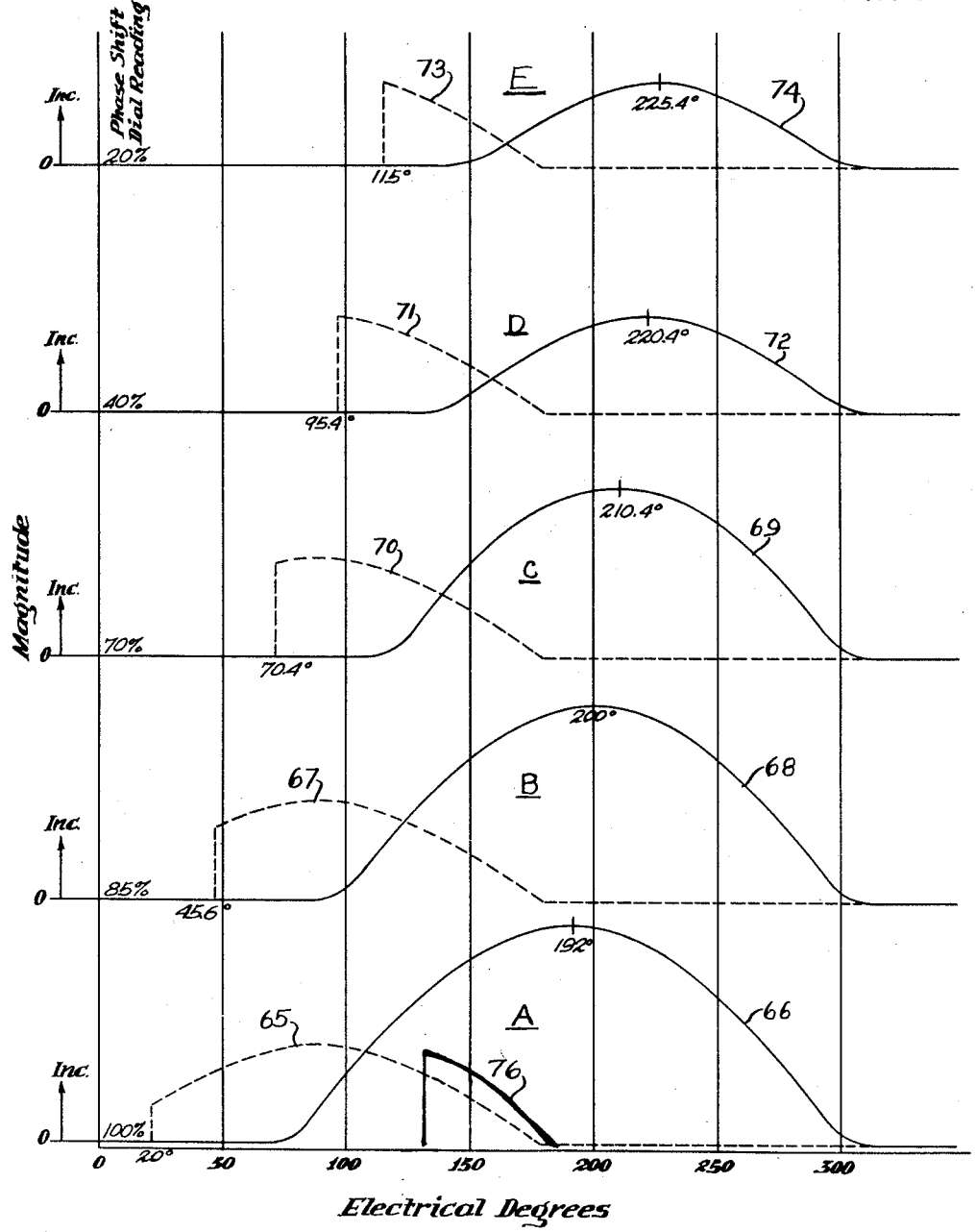
Fig. 5 is a view showing a series of graphs illustrating the relation between the magnetic force voltage and the magnetic force for five different values of phase shift of the applied voltage.

In portion A of Fig. 5, the curve 65 represents the voltage of the rectifier 33 as it appears across winding 30 of the transformer 29 when the phase shifter 38 has been adjusted to the 100% phase shift position. The tube or rectifier 33 starts firing at about 20 degrees after zero of the supply voltage 31 and continues to pass current to about 180 degrees of the half cycle. The force developed by the coil 28 in the armature circuit is represented by curve 66. It is to be observed that the force begins to develop at about 80 degrees but does not reach a maximum until at about 192 degrees, falling off to zero at about 320 degrees. Thus the lagging of the maximum magnetic force as developed by the armatures 23 and 26 on the work piece, behind the applied voltage is illustrated.

In portion B of Fig. 5 the relationship between the voltage exhibited by the transformer 29 and the force developed by the armatures 23 and 26 is illustrated by curves 67 and 68, respectively. In this case the phase shift control 38 has been set at the 85% point so that the voltage across winding 30 of transformer 29 occurs at about 45 to 46 degrees of the supply voltage half cycle. The force developed by the armatures 23 and 26 commences to increase from zero at about 100 degrees and reaches a maximum at about 200 degrees, the force falling off to zero at about 310 degrees. Thus portion B of Fig. 5 indicates that the magnetic force reaches a maximum about 8 degrees later than in portion A.

Portions C, D and E of Fig. 5 are curves showing the occurrences of the maximum force developed by the armatures 23 and 26 at phase shift values of 70%, 40% and 20%. In portion C, curve 69 shows the maximum force developed by the armatures 23 and 26 occurs at about 210 degrees, while curve 70 shows that the voltage appearing across winding 30 of the transformer 29 occurred at about 70 to 71 degrees.

In portion D where the phase shift is 40%, the voltage appearing across the winding 30 of transformer 29 occurred at about 95 to 96 degrees as shown by curve 71, and the maximum force developed by the armatures 23 and 26 occurs at about 220 to 221 degrees. It will be observed that the amplitudes of the curves 66, 68, 69 and 72 diminish from the phase shift of 100% to the phase shift of 40%.

In portion E of Fig. 5 curve 74 shows that the voltage appearing across transformer winding 30 occurs at about 115 degrees of the supply voltage 31 and that the maximum force developed by the armatures 23 and 26 occurs at about 225 to 226 degrees as shown by curve 74.

By superimposing the curve of the voltage applied to the welding circuit to portion A of Fig. 5, the phase relationship of the electrode voltage as applied to the work pieces to the force produced by the armatures 23 and 26 is readily observable. Curve 76 shows the electrode voltage as applied to the work pieces, that being the voltage that produces the weld current.

Figure 2 shows a modification of the magnetic force circuit. In that modification the transformer 29 of Fig. 1 has been omitted, and instead of a single turn 28, a plurality of magnetizing turns 80 are provided. These turns are energized directly from the rectifier 33'. The welding circuit transformer is the same as in Fig. 1. Therefore, the same reference characters with primes affixed are employed. The control of the firing of the rectifiers 33' and 44' is by phase shift, as in Fig. 1.

In Figure 3 there is a further modification of the force producing circuit. As there shown, the number of turns on the armature 23" are less than they are on the armature 23' but higher voltage is applied as indicated by the turns on the secondary winding 30". Thus the magnetomotive force required for energization of the armatures is obtained by higher current and fewer turns, but the magnetizing current is less than it is in the case of Fig. 1, but higher than it would be in the case of Fig. 2 for the same magnitudes of force.

The controls for the welding circuit transformer and the force producing circuit transformer are the same as in the case of Figs. 1 and 2. Therefore, the same reference characters with appropriate primes affixed designate corresponding and similar parts.

Having thus described the invention, it will be apparent to those of ordinary skill in the art to which the invention pertains that the illustrated embodiments admit of modifications and changes without departing from either the spirit or the scope of the invention.

Therefore, what is claimed as new and desired to be secured by Letters Patent is:

1. A magnetic force welding system comprising: a pair of welding electrodes adapted to clamp work therebetween, one of said electrodes being movable toward and away from the other electrode; an electromagnetically operated armature connected to said movable electrode; an energizing winding mounted in fixed position with respect to the other electrode and adapted when energized to attract said armature and said movable electrode toward the other electrode: a first welding transformer having a primary and a secondary winding and means connecting the respective ends of said secondary winding to the respective welding electrodes; a second transformer having a primary and a secondary winding and means connecting the respective ends of the secondary winding thereof to the respective ends of said energizing winding; a source of alternating potential; a pair of control devices connected in parallel and to said source and means connecting said control devices, respectively, to the primary windings of the respective transformers, said control devices being adapted to control energization of said transformers from said source; and means for simultaneously initiating operation of said control devices.

2. A magnetic force welding machine comprising spaced electrodes adapted to receive a work piece between them, one electrode being stationary and the other movable relative thereto, means for positioning the relatively movable electrode on the work piece in contact with the other electrode, a magnetic force means comprising a stationary armature and a movable armature supported by the positioning means, a first means for supplying unidirectional welding current of controlled duration to the work piece through said electrodes, means for controlling the initiation of flow of weld current, a magnetizing winding for the armatures, a second means for energizing said magnetizing winding with electric current which is controllable independently of the welding current and means for controlling the duration and phase relation of the magnetizing winding current with respect to the initiation of the welding current, whereby the time of application of the force developed by the movable armature on the work piece may be varied with reference to the initiation of the weld current.

3. A magnetic force welder as in claim 2 in which the weld current initiation control means is a phase shifting device, the magnetic winding means comprises a single turn energized by a transformer having primary and secondary windings, and that the primary winding is provided with means for applying pulses of rectifier A.C. voltage thereto of predetermined duration and phase relation to the supply voltage and to the time of initiation of the applied voltage to the electrodes.

4. A process for the electric resistance welding of fusible materials under conditions requiring that the flow of welding current be of very short duration, the steps comprising closing a pair of welding electrodes against the work; simultaneously energizing a pair of control devices from a source of alternating potential after said electrodes are closed against the work, said control devices being independent of each other and each thereof being adapted to permit flow of current from said source at the end of a preselected time interval; supplying current from one of said control devices at the end of the time interval therefor and effecting thereby a flow of welding current between said electrodes; supplying current from the other of said control devices at the end of the time interval therefor and applying said last named current to an electromagnetic means to cause said electromagnetic means to apply an additional closing force to the electrodes; the aforementioned steps of supplying current from said control devices being performed in timed relationship with respect to each other during the same half cycle of the alternating potential from said source.

References Cited in the file of this patent

UNITED STATES PATENTS

| | | |
|---|---|---|
| 2,089,213 | Labodie | Aug. 10, 1937 |
| 2,315,916 | Whiteley et al. | Apr. 6, 1943 |
| 2,401,528 | Vang | June 4, 1946 |
| 2,459,796 | Dawson | Jan. 25, 1949 |
| 2,472,043 | Callender | May 31, 1949 |
| 2,477,117 | Cox et al. | July 26, 1949 |
| 2,769,080 | Welch | Oct. 30, 1956 |
| 2,776,362 | Welch | Jan. 1, 1957 |